United States Patent
Kishida

(10) Patent No.: US 6,798,373 B2
(45) Date of Patent: Sep. 28, 2004

(54) FM-CW RADAR SYSTEM

(75) Inventor: Masayuki Kishida, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/258,269

(22) PCT Filed: Feb. 6, 2002

(86) PCT No.: PCT/JP02/00987
§ 371 (c)(1),
(2), (4) Date: Oct. 22, 2002

(87) PCT Pub. No.: WO02/063336

PCT Pub. Date: Aug. 15, 2002

(65) Prior Publication Data
US 2003/0048216 A1 Mar. 13, 2003

(30) Foreign Application Priority Data
Feb. 6, 2001 (JP) ........................................ 2001-030010

(51) Int. Cl.[7] .............................................. G01S 13/93
(52) U.S. Cl. ........................ 342/70; 342/109; 342/115; 342/85; 342/196
(58) Field of Search .............................. 342/70–72, 85, 342/87, 109, 111, 115, 192, 196

(56) References Cited

U.S. PATENT DOCUMENTS 5,381,153 A * 1/1995 Saito et al. ................. 342/70
5,546,088 A * 8/1996 Trummer et al. ............ 342/124
5,940,024 A * 8/1999 Takagi et al. ................ 342/70
6,067,038 A * 5/2000 Uehara et al. ............... 342/70
6,369,748 B1 * 4/2002 Uehara ........................ 342/70

FOREIGN PATENT DOCUMENTS

| DE | 19935123 A1 | * | 3/2000 | ........... G01S/13/34 |
| EP | 1020736 A2 | * | 7/2000 | ........... G01S/13/48 |
| JP | 05019045 A | * | 1/1993 | ........... G01S/13/34 |

* cited by examiner

Primary Examiner—John B. Sotomayor
Assistant Examiner—Isam Alsomiri
(74) Attorney, Agent, or Firm—Fogg and Associates, LLC; Laura A. Ryan

(57) ABSTRACT

An FM-CW radar system comprises a modulating signal generating means for changing a modulating signal to be applied to a FM-CW wave, a calculating means for calculating a distance or relative velocity with respect to a target object by performing processing for detection by fast-Fourier transforming a beat signal occurring between a transmitted signal and a received signal, and a control means for determining a detection range based on the calculated distance, and for performing control to change the modulating signal, wherein the modulating signal is changed by changing one parameter selected from among a modulation frequency, a triangular wave frequency, and a transmit wave center frequency. The detection range is set to a distance obtained by adding a prescribed distance to the shortest distance detected, or to a distance obtained by subtracting a prescribed distance from the distance of a fixed object.

5 Claims, 6 Drawing Sheets

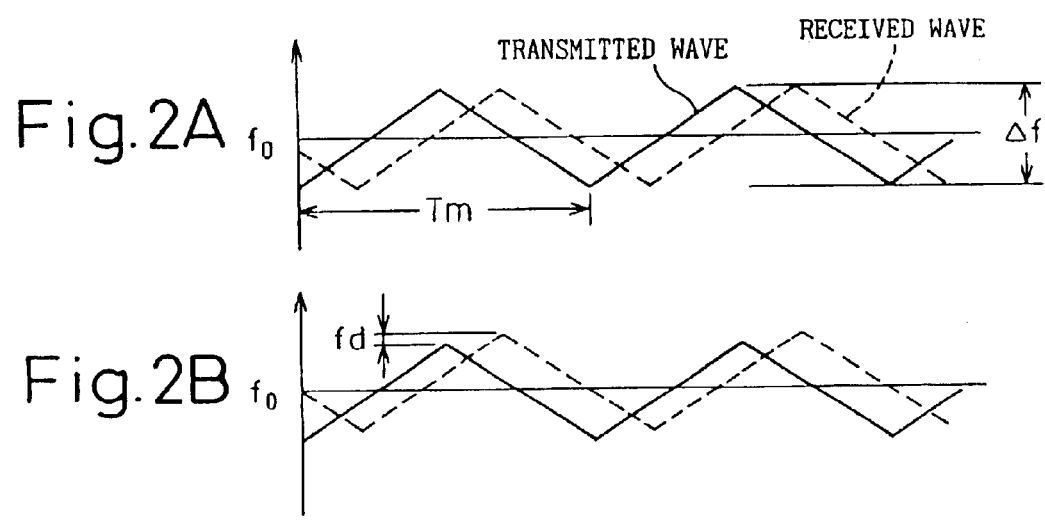
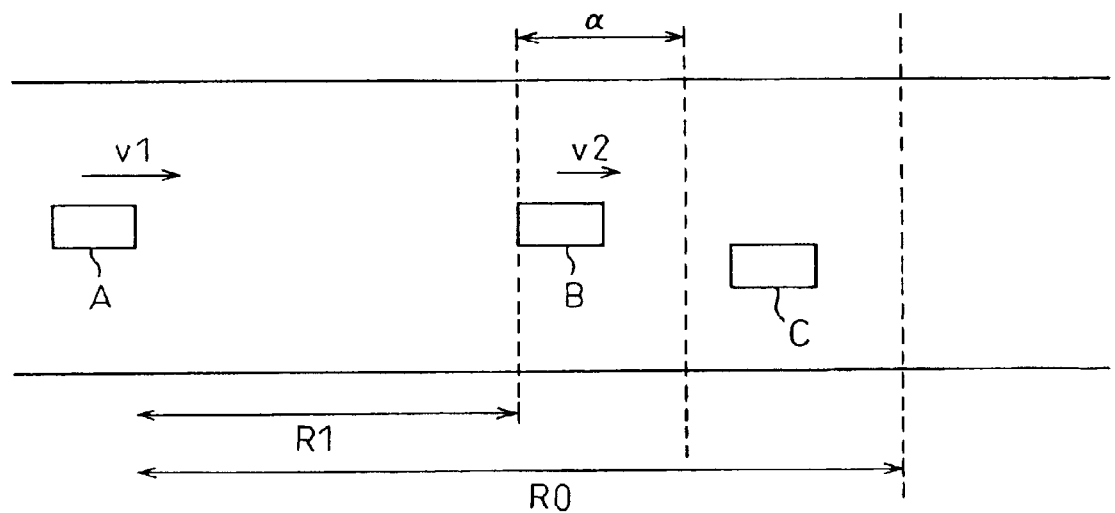

6,798,373 B2

FM-CW RADAR SYSTEM

TECHNICAL FIELD

The present invention relates to a frequency-modulated continuous-wave (FM-CW) radar system and, more particularly, to an FM-CW radar system that performs processing for detecting the distance and relative velocity of a target object by variably setting the target object detection range.

BACKGROUND ART

An FM-CW radar system is mounted, for example, on a vehicle or the like, and measures the distance or relative velocity of a target object, such as a vehicle traveling in front, by transmitting a continuous wave frequency-modulated with a triangular wave. The distance or the relative velocity is measured in the following manner.

First, the transmitted wave from the radar is reflected by a vehicle traveling in front, and a beat signal (radar signal) occurring between the received signal of the reflected wave and the transmitted signal is obtained. This beat signal is fast-Fourier transformed (FFT) to analyze the frequency. The frequency-analyzed beat signal exhibits a peak at which the intensity becomes large corresponding to the target object. The peak frequency corresponding to this peak carries information concerning the distance, and the peak frequency differs between the up portion and down portion of the triangular FM-CW wave due to the Doppler effect associated with the relative velocity of the vehicle in front.

The distance and relative velocity of the vehicle in front are determined from the peak frequencies in the up and down portions of the triangular wave. If there is more than one vehicle traveling in front, one pair of peak frequencies, one in the up portion and the other in the down portion, occurs for each vehicle. The pairing of the peak frequencies between the up and down portions is done on a vehicle-by-vehicle basis.

As described above, in the prior art FM-CW radar system, the pairing is performed based on the peak frequencies obtained by applying signal processing to the transmission/reception beat signal, and the distance and relative velocity of the corresponding target object are determined; in reality, however, many target objects are detected and, if signal processing is to be performed for all the detected objects, not only a long processing time but also a large memory capacity will be required.

Furthermore, the number of target detection outputs that the radar system can produce is limited by the data update rate and communication baud rate of the system. As a result, data necessary for another system, for example, a speed control system, must be output by selecting such data within the radar system, but the selection requires complicated processing.

Because of these limitations, coupled with the limited memory capacity, there arises the possibility that, depending on conditions, data relating to the intended target object may be discarded, causing an ill effect on, for example, the operation of the speed control system.

To address this problem, it is practiced in the prior art to limit the detection range of the FM-CW radar system and set the range to the distance necessary for the operation of the speed control system. Limiting the detection range, however, greatly affects the detection accuracy of the radar system in detecting the distance and relative velocity of the target object.

In view of this, it is an object of the present invention to provide an FM-CW radar system that can variably set the target object detection range, thereby reducing the memory capacity required within the system and improving the accuracy of target object detection.

DISCLOSURE OF THE INVENTION

To solve the above-described problem, according to the present invention, there is provided an FM-CW radar system which transmits an FM-CW wave and receives a reflected wave from a target object, comprising: modulating signal generating means capable of changing a modulating signal to be applied to the FM-CW wave; calculating means for calculating a distance or relative velocity with respect to the target object by performing processing for detection of the target object by fast-Fourier transforming a beat signal occurring between a transmitted signal of the FM-CW wave and a received signal of the reflected wave; and control means for determining a detection range based on the distance calculated by the calculating means, and for performing control for the modulating signal to be changed by the modulating signal generating means. Here, the modulating signal generating means is configured to be able to change the modulating signal by changing one parameter selected from among a modulation frequency, a triangular wave frequency, and a transmit wave center frequency associated with the FM-CW wave.

Provisions are also made so that, when two or more target objects are detected, the control means selects the shortest distance from among the distances of the detected target objects calculated by the calculating means and performs control to change the modulating signal so that the detection range becomes equal to a distance obtained by adding a prescribed distance to the selected distance, while when a vehicle equipped with the radar system is traveling around a curve, and when a detected target object can be judged to be a roadside fixed object, the control means performs control to change the modulating signal so that the detection range becomes equal to a distance obtained by subtracting a prescribed distance from the distance of the target object calculated by the calculating means.

Further, the FM-CW wave from the FM-CW radar system is transmitted as a plurality of beams over a prescribed scanning angle, and the modulating signal for changing the detection range is changed for each of the beams.

BRIEF DESCRIPTION OF THE DRAWINGS

The present invention will be described below with reference to the accompanying drawings.

FIGS. 2A and 2B are diagrams for explaining the principle of the prior art FM-CW radar system.

FIG. 3 is a diagram for explaining the detection range of an FM-CW radar system when the radar-equipped vehicle is traveling on a straight road.

MODE FOR CARRYING OUT THE INVENTION

First, for a better understanding of the effect achieved by the present invention, a description will be given of how a conventional FM-CW radar system, to which the present invention is not applied, performs processing when detecting the distance and relative velocity of a target object.

Figure 1:
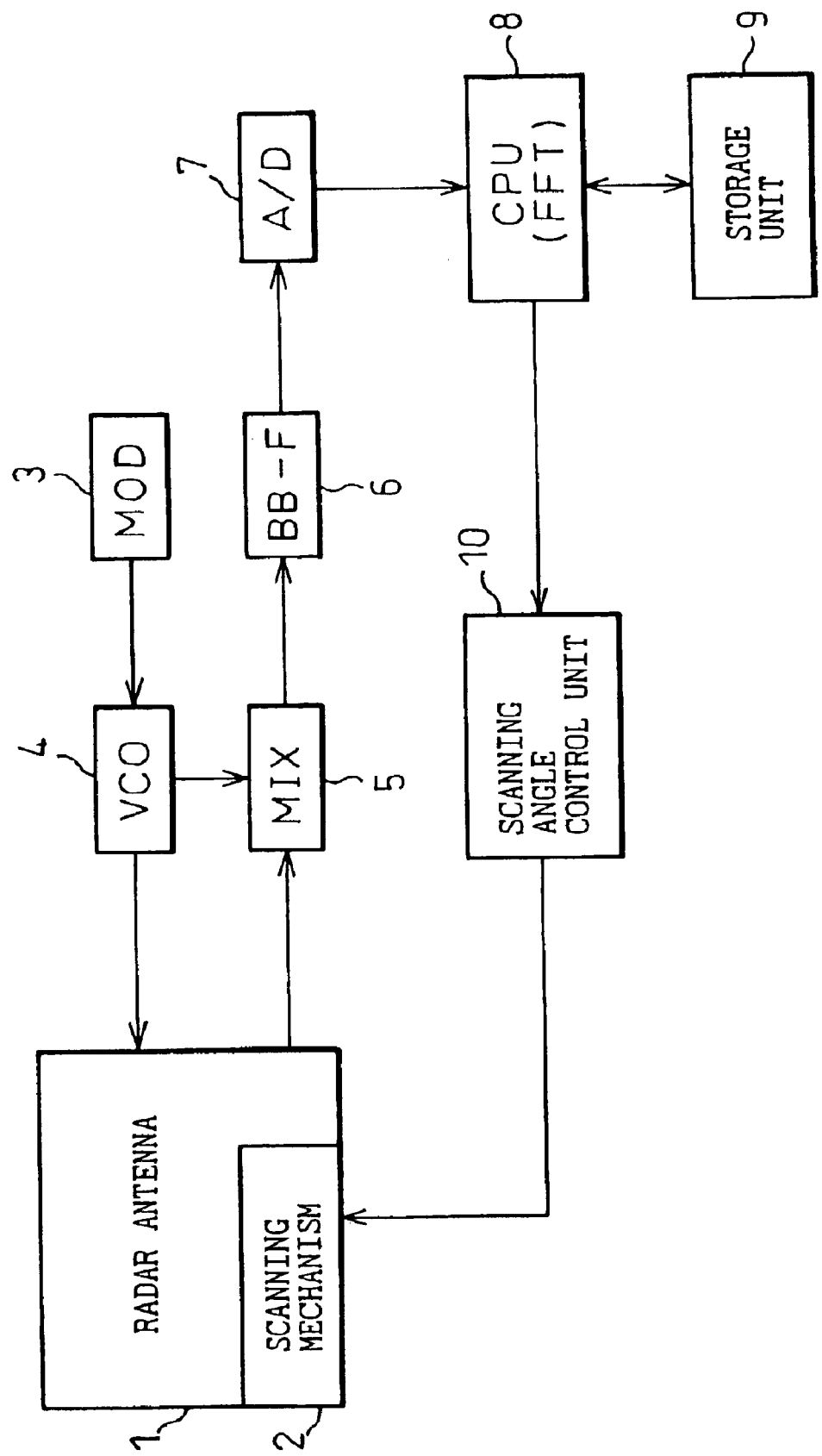
FIG. 1 is a diagram showing the configuration of a prior art FM-CW radar system.

FIG. 1 shows the configuration of the conventional FM-CW radar system. As shown, a modulating signal generator 3 applies a modulating signal to a voltage-controlled oscillator 4 for frequency modulation, and the frequency-modulated wave is transmitted via the radar antenna 1. On the other hand, a portion of the transmitted signal is separated and fed into a frequency converter 5 which functions as a mixer (MIX).

The signal reflected from a target object, such as a vehicle traveling in front, is received via the radar antenna 1, and the received signal is mixed in the frequency converter 5 with the output signal of the voltage-controlled oscillator 4 to produce a beat signal. The beat signal is passed through a baseband filter 6, and is converted by an A/D converter 7 into a digital signal; the digital signal is then supplied to a CPU 8 where signal processing such as fast Fourier transform is applied to the digital signal to obtain the distance and relative velocity of the target object.

A storage unit 9 is connected to the CPU 8 and stores the results of signal processing as well data necessary for the signal processing.

A single-antenna system or a two-antenna system can be employed for the radar antenna 1; in FIG. 1, an example of a scanning system is shown, so that the radar antenna 1 is equipped with a scanning mechanism 2. The scanning mechanism 2 scans the radar beam in accordance with the scanning angle controlled by a scanning angle control unit 10.

FIGS. 2A and 2B are diagrams each showing the relationship between the transmitted wave and the received wave in the above FM-CW radar system.

In the FM-CW radar system, a triangular wave is often used as the modulating signal, and the description given hereinafter deals with the case where a triangular wave is used as the modulating signal, but it will be appreciated that a modulating wave of another shape, such as a sawtooth wave or a trapezoidal wave, can be used instead of the triangular wave.

Frequency modulation, for example, with a triangular wave, is applied, and the frequency-modulated wave is transmitted; then, a reflected wave from the target object is received, and the received wave is frequency-demodulated using the frequency-modulated wave as the local frequency. Here, the received wave from the target is shifted in frequency from the transmitted wave (i.e., produces a beat) according to the distance between the radar antenna 1 and the target and also to the Doppler shift due to the relative velocity of the target. Therefore, the distance and the relative velocity of the target object can be measured from this frequency shift.

FIG. 2A shows the relationship between the transmitted wave and the received wave in the prior art FM-CW radar system when the relative velocity with respect to the target object is 0. The transmitted wave is shown by a solid line, and the received wave by a dashed line. In the figure, $f_0$ is the transmit center frequency of the transmitted wave, $\Delta f$ is the modulation frequency, and Tm is the repetition period. The frequency, fm, of the triangular wave is given by fm=1/Tm. The transmitted wave is reflected from the target object and received by the radar antenna 1; the received wave is shown by the dashed line in FIG. 2A. The round trip time T of the radio wave to and from the target object is given by T=2r/C, where r is the distance to the target object and C is the velocity of propagation of the radio wave.

Here, the received wave is shifted in frequency from the transmitted signal (i.e., produces a beat) according to the distance between the radar and the target object. The beat frequency component fb can be expressed by the following equation.

$$fb=(4\cdot\Delta f/C\cdot Tm)r \quad (1)$$

FIG. 2B, on the other hand, shows the relationship between the transmitted wave and the received wave in the prior art FM-CW radar system when the relative velocity with respect to the target object is v.

The transmitted wave shown by the solid line is reflected from the target object and received by the radar antenna 1; the received wave is shown by the dashed line. Here, the received wave is shifted in frequency from the transmitted wave signal (i.e., produces a beat) according to the distance between the radar system and the target object. In this case, as the relative velocity with respect to the target object is v, a Doppler shift occurs, and the beat frequency component fb can be expressed by the following equation.

$$fb=fr\pm fd=(4\cdot\Delta f/C\cdot Tm)r\pm(2\cdot f_0/C)v \quad (2)$$

In the above equations (1) and (2), the symbols have the following meanings.
- fb: Transmission/reception beat frequency
- fr: Range (distance) frequency
- fd: Velocity frequency
- $f_0$: Center frequency of transmitted wave
- $\Delta f$: Modulation frequency
- Tm: Period of modulation wave
- C: Velocity of light (velocity of radio wave)
- T: Round trip time of radio wave to and from target object
- r: Range (distance) to target object
- v: Relative velocity with respect to target object After signal processing such as a fast Fourier transform is applied to the transmission/reception beat signal by the CPU 8, as described above, pairing is performed on the peak frequencies, and the distance and relative velocity of the target object are determined.

As previously described, in the prior art FM-CW radar system, when many target objects are actually detected, if signal processing is performed for all the detected objects, not only a long processing time but also a large memory capacity is required. One way to address this situation is to output data necessary for another system, for example, a speed control system, by selecting such data within the radar system, but the selection requires complicated processing, and besides, the memory capacity is limited. In this case, there arises the possibility that, depending on conditions, data relating to the intended target object may be discarded, causing an ill effect on, for example, the operation of the speed control system.

To address this problem, it is practiced in the prior art to limit the detection range of the FM-CW radar system and set the range to the distance necessary for the operation of the speed control system. Limiting the detection range, however, greatly affects the detection accuracy of the radar system in detecting the distance and relative velocity of the target object.

In view of this, in the FM-CW radar system according to the present invention, provisions are made to variably set the target object detection range, thereby reducing the memory capacity required within the system and improving the accuracy of target object detection.

An embodiment of the FM-CW radar system according to the present invention will be described below with reference to drawings.

FIG. 3 shows an example in which a vehicle A equipped with the FM-CW radar system is traveling on a road at a speed v1. It is assumed that there are vehicles B and C traveling at a speed v2 on the road in front of the vehicle A. In the illustrated example, the speed v1 of the vehicle A is higher than the speed v2 of the vehicles B and C, so that the distance from the vehicle A to the vehicles B and C is becoming smaller.

It is assumed here that the detection range of the FM-CW radar system mounted on the vehicle A, that is, the maximum distance at which the radar system can effectively detect a target object, is set to R0. This means that the radar system detects all the objects located within the range R0 in front of the vehicle A and, as a result, both the vehicles B and C are detected.

For the speed control system, however, if both of the vehicles B and C are detected, the vehicle B closer to the vehicle A has a greater significance in terms of safety than the vehicle C, and it is not imperative to detect the vehicle C. That is, only the vehicle B need be detected as the target object. This means that, if detection processing is performed so that only the vehicle B can be detected, the required memory capacity can be reduced.

However, if the vehicle C is excluded from the target of detection, the vehicle B, which is closer than the vehicle C is, must be detected more accurately from the safety point of view. Here, when the detection range is set to R0, the detection accuracy for the vehicle B is low. This detection accuracy will be explained below.

In the computation of the distance and relative velocity of a target object and when, for the peak frequencies of the peaks paired by the pairing, the peak frequency in the up portion is denoted by $f_{UP}$ and the peak frequency in the down portion by $f_{DN}$, then from the previously given equations (1) and (2) the distance r and the relative velocity v can be expressed as follows.

$$r = \{(f_{UP} + f_{DN})/2\}/(4 \cdot \Delta f \cdot fm/C) \quad (3)$$

$$v = \{(f_{UP} \pm f_{DN})\}/(2 \cdot f_0/C) \quad (4)$$

From these equations, it can be seen that, as the propagation speed C is known, the distance r and the relative velocity v can be determined based on the peak frequencies $f_{UP}$ and $f_{DN}$ if the modulation frequency $\Delta f$ and the triangular wave frequency fm are fixed values.

The above equations also show that the detection accuracy of the distance r and relative velocity v is determined by the peak frequencies $f_{UP}$ and $f_{DN}$, modulation frequency $\Delta f$, triangular wave frequency fm, and center frequency $f_0$. The detection accuracy can be changed by varying these values.

In the example of FIG. 3, the preset detection range R0 is changed to the distance R at which the vehicle C cannot be detected but the vehicle B can be detected. In that case, when the radar system of the vehicle A detects the distance R1 to the vehicle B, the detection accuracy for the distance R1 is R0/R times as high. To change the distance detection accuracy, the value of the modulation frequency $\Delta f$ or the triangular wave frequency fm should be changed.

For the detection of the relative velocity, the detection accuracy can be changed in like manner; that is, to change the detection accuracy of the relative velocity, the value of the center frequency $f_0$ is changed.

The peak frequencies $f_{UP}$ and $f_{DN}$ are determined by the sampling frequency of the A/D conversion; in the present embodiment, the sampling frequency is not changed because changing the sampling frequency would require complicated processing.

To change the preset detection range R0, the closest target object is selected from among the target objects detected with the detection range R0, and the distance to that object, in the example of FIG. 3, the distance R1 to the vehicle B, is obtained. Here, if the vehicle B were outside the target object detection range, the vehicle B could not be detected; therefore, a prescribed distance α is allowed so as to include the vehicle B within the detection range, and the value of the modulation frequency $\Delta f$ or the triangular wave frequency fm is varied so that R become equal to R1+α.

In the case of a scanning type FM-CW radar system, provisions may be made to change the detection range for each beam scanning angle of the FM-CW wave.

When the detection range is set to R0, if no target object is detected, the value of the modulation frequency $\Delta f$ or the triangular wave frequency fm is reduced, thereby increasing the detection range so that a target object can be detected within the detection range. Once a target object is detected within the detection range, the value of the modulation frequency $\Delta f$ or the triangular wave frequency fm is increased based on the calculated distance of the target object. There will be no problem if the detection accuracy is low until a target object is detected; then, once a target object is detected, the detection accuracy can be increased, as described above, as the target object approaches.

Figure 4:
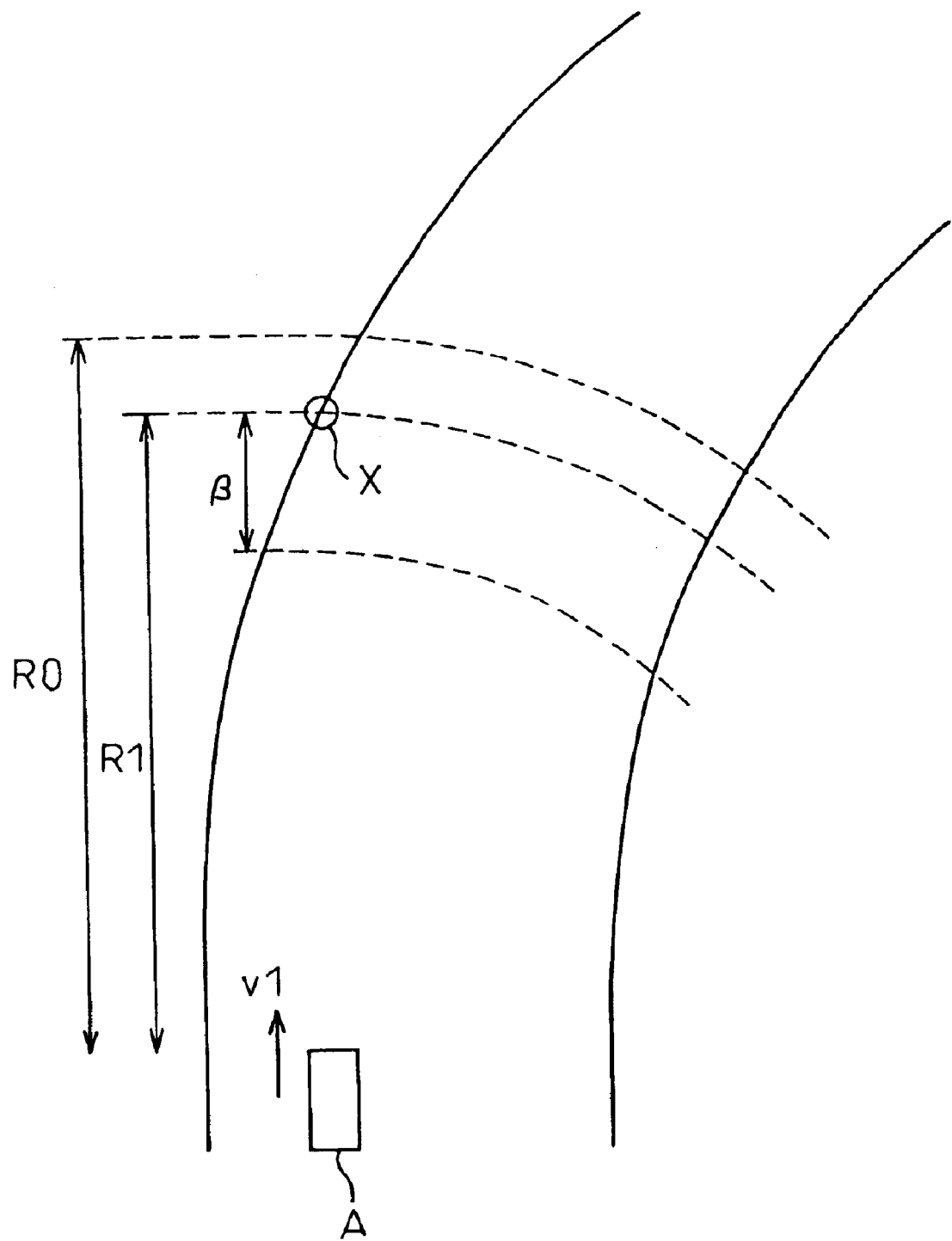
FIG. 4 is a diagram for explaining the detection range of the FM-CW radar system when the radar-equipped vehicle is traveling on a curved road.

The above description has been given assuming the case where the vehicle A is traveling on a straight road, as shown in FIG. 3. Next, a description will be given for the case where the vehicle is traveling on a curved road, as shown in FIG. 4.

It is assumed here that the vehicle A is traveling at a speed v1 on a road curving to the right. At this time, the FM-CW radar system mounted on the vehicle A is transmitting an FM-CW wave beam forward of the vehicle A. It is also assumed that the target object detection range is set to the detection distance R0.

In this case, when the vehicle A is travelling around the rightward curving road, a stationary object located ahead of the vehicle A, for example, a guardrail on the roadside or a vehicle parked on the roadside, will be detected as a target object. Many such target objects will be detected, and if processing is to be performed for all detected objects, a large memory capacity will be required; furthermore, since fixed objects such as a guardrail do not provide significant information for the speed control system, the need for the detection of such fixed objects must be eliminated as much as possible.

However, from the safety point of view, all kinds of roadside fixed objects cannot be excluded from the objects to be detected. Accordingly, the detection range is changed to a value that requires speed control with respect to a fixed object or, in the case of a scanning radar system, the detection range is changed for the scanning angle at which a fixed object is detected.

In the example shown in FIG. 4, when the detection range of the radar system mounted on the vehicle A is set to R0, an object X located ahead of the vehicle A is detected. At this time, the distance to the object X is detected as R1. At the same time, the relative velocity with respect to the object X is calculated, and the object X is thus detected as being a stationary object. Then, by knowing from the rotational position of the steering wheel, the yaw rate car sensor, etc. that the vehicle is traveling around a curve, the object X is judged to be a fixed object located on the roadside.

When the object X can be judged to be a roadside fixed object, the detection range is then set to a distance shorter than the detected distance R1 by a prescribed distance β so that the object X will not be detected within the detection range. More specifically, the value of the modulation frequency Δf or the triangular wave frequency fm is changed so that the detection range R becomes equal to R1-β.

FIG. 4 has shown the case of a rightward curving road, but the above also applies for the case of a leftward curving road. The same can be said of the case where the vehicle itself turns while traveling on a road.

Further, when the FM-CW radar system mounted on the vehicle is a scanning type radar system, if the object X can be judged to be a fixed object located on the roadside, then it can be determined on which side of the road the object is located in accordance with the curving direction of the road; therefore, the detection range can be changed only for the beam directed toward the detected side of the road, rather than changing the detection range for all the beams within the scanning angle.

Figure 5:
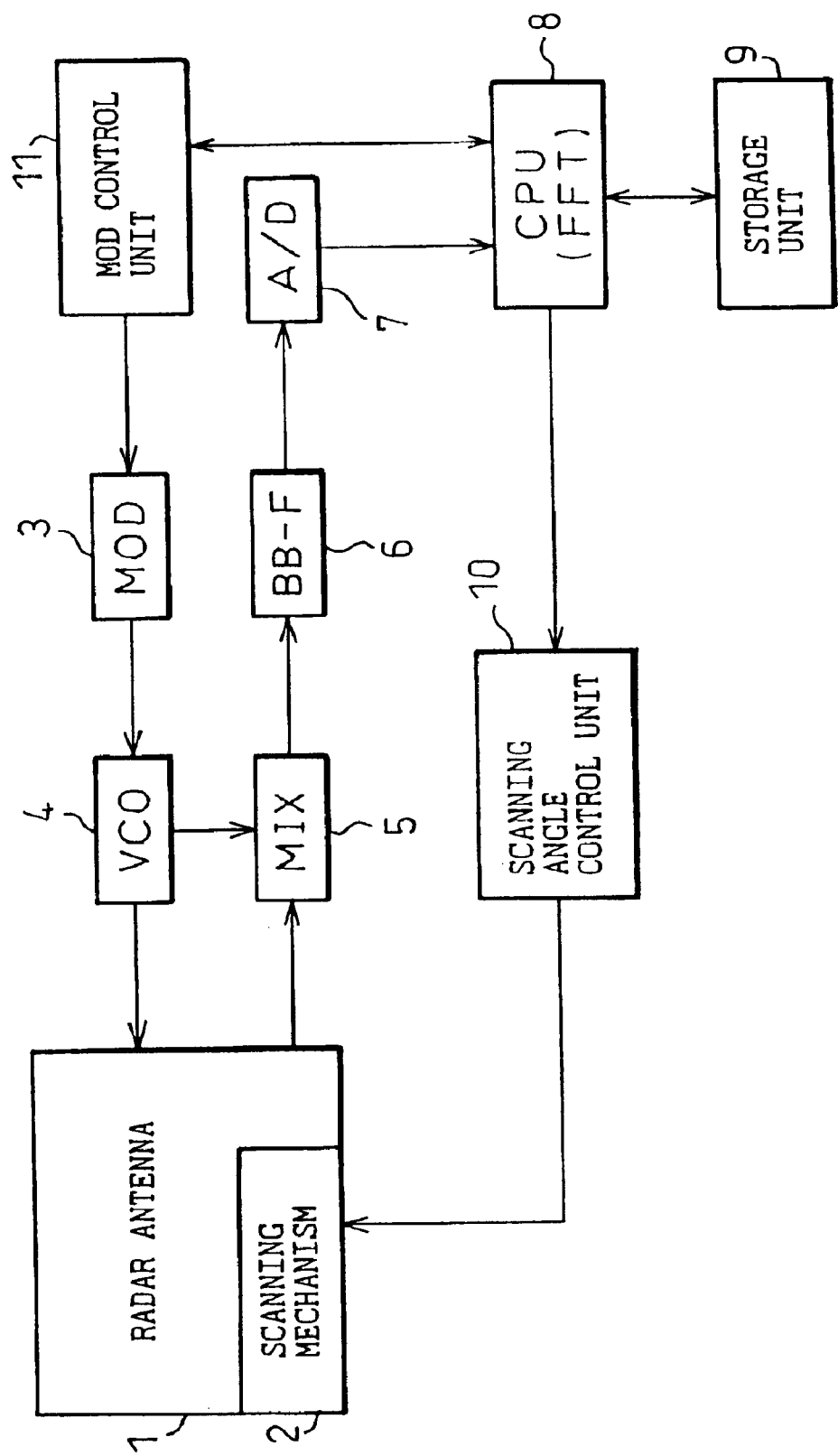
FIG. 5 is a diagram showing the configuration of the FM-CW radar system according to the present invention.

FIG. 5 shows the configuration of the FM-CW radar system that can transmit an FM-CW wave by changing the target object detection range as described above. The configuration of the FM-CW radar system shown in FIG. 5 differs from that of the prior art FM-CW radar system shown in FIG. 1 by the inclusion of a modulating signal generator control unit 11. Otherwise, the configuration is the same as that of the FM-CW radar system shown in FIG. 1, and the same components are designated by the same reference numerals as those in FIG. 1.

The modulating signal generator control unit 11 controls the modulating signal generator 3 in accordance with the timing directed by the CPU 8, and the FM-CW wave is transmitted from the radar antenna 1 by changing the modulation frequency Δf, triangular wave frequency fm, or transmit wave center frequency $f_0$ with that timing.

FIGS. 6A to 6D show how the modulation frequency Δf, the triangular wave frequency fm, or the transmit wave center frequency $f_0$, respectively, is changed in the FM-CW wave to be transmitted from the radar antenna 1, in order to change the target object detection range.

Figure 6:
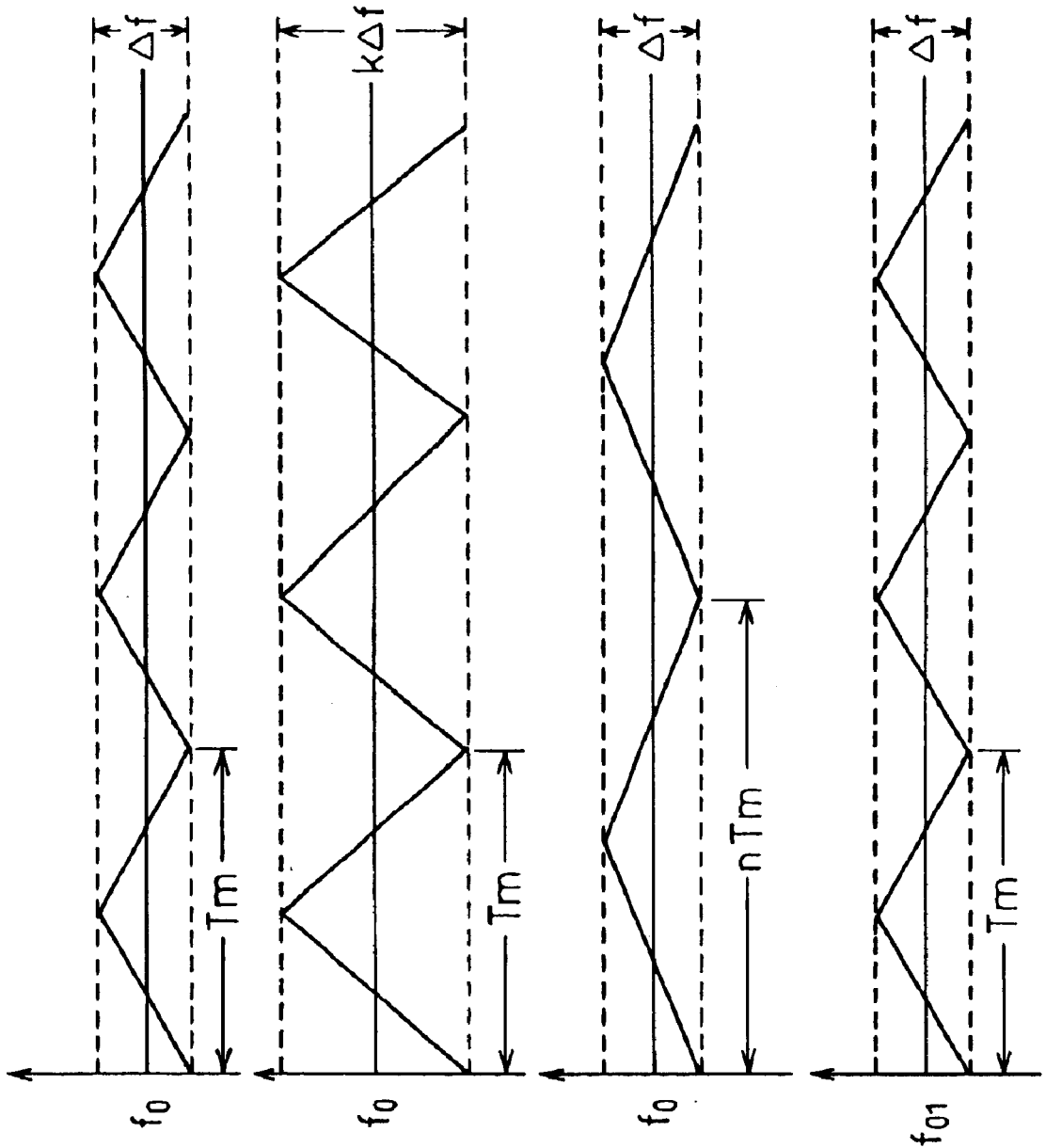
FIGS. 6A to 6D are diagrams showing specific examples of the triangular FM-CW waveforms used in the FM-CW radar system according to the present invention.

FIG. 6A shows the FM-CW wave before any change is applied. FIG. 6B shows the case in which the modulation frequency Δf of the FM-CW wave shown in FIG. 6A is multiplied by k, FIG. 6C shows the case in which the triangular wave frequency fm of the FM-CW wave is reduced, that is, the modulation wave period Tm is multiplied by n, and FIG. 6D shows the case in which the center frequency $f_0$ of the FM-CW wave is changed to $f_{01}$, for the case of a triangular wave.

Next, the control and operation performed in the FM-CW radar system of the present embodiment will be described with reference to the flowchart of FIG. 7. The control and operation procedure shown in the flowchart is performed primarily by the radar signal processing function of the CPU 6 shown in FIG. 5.

Figure 7:
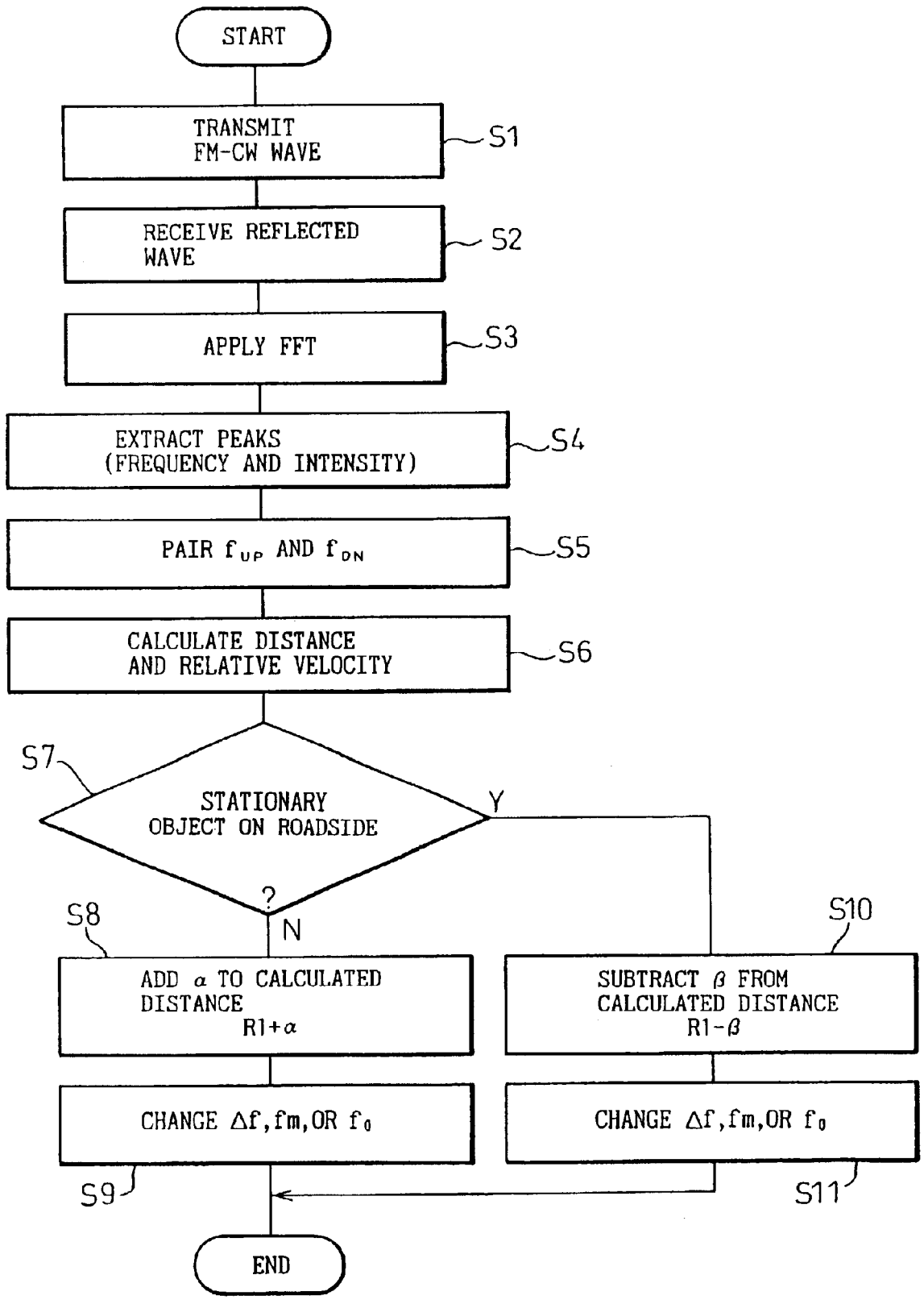
FIG. 7 is a diagram showing a flowchart for the detection range control and operation performed in the FM-CW radar system according to the present invention.

In FIG. 7, upon initiation of the operation, the FM-CW wave, as a triangular wave having a prescribed modulation frequency Δf, triangular wave frequency fm, and transmit wave center frequency $f_0$, is transmitted from the radar antenna 1 toward a target object (step S1). Here, in the case of a scanning type FM-CW radar system, a plurality of FM-CW wave beams are projected over a prescribed angle range by means of the scanning mechanism 2. The angle of each beam is calculated here.

Next, the transmitted wave is reflected by a target object, and the reflected wave is received by the radar antenna 1 (step S2).

At this time, a beat signal is produced by the interference between the transmitted signal and the received signal, and this beat signal is processed via FFT for the up portion and the down portion of each beam (step S3).

Then, from the peak data processed via FFT, the peak frequency and its intensity are extracted for the up portion and the down portion of each beam (step S4).

Next, from each beam, frequency data close in frequency are grouped together for the up portion and the down portion, respectively, and the angle of each group is calculated. Then, the peaks to be paired between the up portion and the down portion are searched for, based on the angle, frequency, and intensity of each group. For the thus paired peaks, the peak frequency $f_{UP}$ in the up portion and the peak frequency $f_{DN}$ in the down portion are obtained (step S5).

Based on the thus obtained peak frequencies $f_{UP}$ and $f_{DN}$, distance r1 and relative velocity v1 are calculated from the previously given equations (3) and (4), and stored in memory (step S6).

Based on the relative velocity v1 calculated here, it is determined whether the target object is stationary or not and, if the detected object is a stationary object, it is determined whether the stationary object is a fixed object located on the roadside, by detecting whether the vehicle is traveling around a curve (step S7).

If it is not a fixed object located on the roadside, that is, if the vehicle is traveling straight ahead (N), distance R=r1+α is calculated by adding a prescribed distance α to the distance r1 calculated in step S6 (step S8).

Next, one of the modulation frequency Δf, triangular wave frequency fm, and transmit wave center frequency $f_0$ of the FM-CW wave to be transmitted is changed so that the detection range becomes equal to the distance R (step S9). Thereafter, the FM-CW wave generated by thus changing one of the modulation frequency Δf, triangular wave frequency fm, and transmit wave center frequency $f_0$ is transmitted from the radar antenna 1.

Here, if the distance r1 detected from the target object changes each time it is detected, the detection range will be changed according to the changing distance. This means that the detection accuracy is gradually increased as the vehicle closes on the target object.

If a plurality of target objects are detected because some other target object has come into the detection range in addition to the initially captured target object, the distance of the target object closer to the vehicle is selected. If some other target object becomes closer to the vehicle than the initially captured target object is, the detection range is then set based on the distance to that other target object.

On the other hand, if, in step S7, it is determined that the detected target object is a fixed object located on the roadside, that is, if the vehicle is traveling around a curve (Y), distance R=r1-β is calculated by subtracting a prescribed distance β from the distance r1 calculated in step S6 (step S10).

Next, one of the modulation frequency Δf, triangular wave frequency fm, and transmit wave center frequency $f_0$ of the FM-CW wave to be transmitted is changed so that the detection range becomes equal to the calculated distance R (step S11). Thereafter, the FM-CW wave generated by thus changing one of the modulation frequency Δf, triangular wave frequency fm, and transmit wave center frequency $f_0$ is transmitted from the radar antenna 1.

Here, when the FM-CW radar system mounted on the vehicle A is a scanning type radar system, then if it is determined that the target object is a fixed object located on the roadside, it can be determined on which side of the road the object is located in accordance with the curving direction of the road, and the detection range can be changed only for the beam directed toward the detected side of the road.

Further, upon detecting that the vehicle has passed the curve and entered a straight road, the modulation frequency Δf, the triangular wave frequency fm, or the transmit wave center frequency $f_0$, whichever has been changed, may be changed back to its initial value to regain the detection range preset for straight road traveling conditions.

As described above, according to the present invention, the radar system transmits the FM-CW wave by changing one of the modulation frequency Δf, triangular wave frequency fm, and transmit wave center frequency $f_0$ of the FM-CW wave according to the detected target object; by so doing, the target object detection range can be readily changed.

By changing the detection range in this way, only the necessary target object can be easily selected from among a plurality of detected target objects. As a result, the memory capacity required for detection processing can be reduced by excluding unwanted target objects from the objects to be detected.

Further, as the detection range is changed according to the distance of the closest target object among the plurality of detected target objects, the detection accuracy can be gradually increased as the vehicle closes on the target object.

Furthermore, as the detection range can be changed only for a beam projected at a particular angle, when the vehicle equipped with the FM-CW radar system is traveling around a curve, fixed objects located on the roadside can be excluded from the objects to be detected.

What is claimed is:

1. An FM-CW radar system which transmits an FM-CW wave and receives a reflected wave from a target object, comprising:

modulating signal generating means capable of changing a modulating signal to be applied to said FM-CW wave;

calculating means for calculating a distance or relative velocity with respect to said target object by performing processing for detection of said target object by fast-Fourier transforming a beat signal occurring between a transmitted signal of said FM-CW wave and a received signal of said reflected wave; and control means for determining a detection range based on the distance calculated by said calculating means, and for performing control for said modulating signal to be changed by said modulating signal generating means; wherein when two or more target objects are detected, said control means selects the shortest distance from among the distances of said detected target objects calculated by said calculating means and determines said detection range based on a distance obtained by adding a prescribed distance to said selected distance.

2. An FM-CW radar system as claimed in claim 1, wherein said modulating signal generating means is capable of changing said modulating signal by changing one parameter selected from among a modulation frequency, a triangular wave frequency, and a transmit wave center frequency associated with said FM-CW wave.

3. An FM-CW radar system which transmits an FM-CW wave and receives a reflected wave from a target object, comprising:

modulating signal generating means capable of changing a modulating signal to be applied to said FM-CW wave;

calculating means for calculating a distance or relative velocity with respect to said target object by performing processing for detection of said target object by fast-Fourier transforming a beat signal occurring between a transmitted signal of said FM-CW wave and a received signal of said reflected wave; and control means for determining a detection range based on the distance calculated by said calculating means, and for performing control for said modulating signal to be changed by said modulating signal generating means; when a vehicle equipped with said radar system is traveling around a curve, and when a detected target object can be judged to be a fixed object, said control means performs control to change said modulating signal so that said detection range becomes equal to a distance obtained by subtracting a prescribed distance from the distance of said target object calculated by said calculating means.

4. An FM-CW radar system as claimed in claim 1 or 3, wherein said FM-CW wave is transmitted as a plurality of beams over a prescribed scanning angle, and said modulating signal for changing said detection range is changed for each of said beams.

5. An FM-CW radar system as claimed in claim 3, wherein said modulating signal generating mean is capable of changing said modulating signal by changing one parameter selected from among a modulation frequency, a triangular wave frequency, and a transmit wave center frequency associated with said FM-CW wave.

* * * * *